US008241918B2

(12) United States Patent
Zeitler et al.

(10) Patent No.: US 8,241,918 B2
(45) Date of Patent: Aug. 14, 2012

(54) BEVERAGE DISPENSING DEVICE WITH FRESHNESS INDICATOR

(75) Inventors: Guenter Zeitler, Aachen (DE); Matthias Bertram, Cologne (DE); Christian Baeumer, Aachen (DE)

(73) Assignee: Koninklijke Philips Electronics N.A., Eindhoven (NL)

( * ) Notice: Subject to any disclaimer, the term of this patent is extended or adjusted under 35 U.S.C. 154(b) by 567 days.

(21) Appl. No.: 12/306,284

(22) PCT Filed: Jun. 13, 2007

(86) PCT No.: PCT/IB2007/052234

§ 371 (c)(1),
(2), (4) Date: Dec. 23, 2008

(87) PCT Pub. No.: WO2008/004144

PCT Pub. Date: Jan. 10, 2008

(65) Prior Publication Data

US 2009/0258120 A1 Oct. 15, 2009

(30) Foreign Application Priority Data

Jul. 3, 2006 (EP) .................................... 06116492

(51) Int. Cl.
*G01N 25/20* (2006.01)

(52) U.S. Cl. ................ 436/147; 436/1; 436/43; 436/50; 436/150; 422/105; 422/119

(58) Field of Classification Search ................ 436/1, 43, 436/50, 147, 150; 422/105, 119
See application file for complete search history.

(56) References Cited

U.S. PATENT DOCUMENTS

| | | | | |
|---|---|---|---|---|
| 2003/0219061 | A1 | 11/2003 | Seeger | |
| 2004/0232173 | A1 | 11/2004 | Saveliev et al. | |
| 2005/0121431 | A1 | 6/2005 | Yuen | |
| 2006/0011664 | A1 | 1/2006 | Hammond | |
| 2007/0207040 | A1 * | 9/2007 | Hughes et al. | 417/44.1 |
| 2008/0029541 | A1 * | 2/2008 | Wallace et al. | 222/129.3 |
| 2008/0283550 | A1 * | 11/2008 | Nighy et al. | 222/1 |

(Continued)

FOREIGN PATENT DOCUMENTS

EP 1213258 A2 6/2002

(Continued)

OTHER PUBLICATIONS

Perfect Draft Beer Tap: HD3600/20, Philips Domistic Appliences and Personal Care.

*Primary Examiner* — Lyle Alexander

(57) ABSTRACT

A beverage dispensing device including a housing, a tapping device for dispensing a beverage, a beverage container connectable with the tapping device, a freshness indicator device, a data input unit for recording replacement of the beverage container, a temperature sensor for measuring the storage temperature of the beverage, a temperature controller for adjusting the cooling temperature of a chiller, a storage unit for storing the freshness criteria, and a processing unit. The temperature sensor transmits the current beverage storage temperature to the processing unit and the processing unit calculates, depending on a recorded storage temperature period and based on stored freshness criteria, the actual freshness of the beverage, the time left until expiry of the freshness of the beverage and/or the date of expiry of the freshness of the beverage. The processing unit transmits the calculated data to the display.

15 Claims, 3 Drawing Sheets

U.S. PATENT DOCUMENTS

2010/0193537 A1* 8/2010 Doglioni Majer ................ 221/1

FOREIGN PATENT DOCUMENTS

| | | | |
|---|---|---|---|
| JP | 57181831 | A | 11/1982 |
| JP | 2002295952 | A | 10/2002 |
| WO | 9836671 | A1 | 8/1998 |
| WO | 03050031 | A1 | 6/2003 |
| WO | 2004051163 | A2 | 6/2004 |
| WO | 2005113345 | A1 | 12/2005 |
| WO | 2005113415 | A1 | 12/2005 |
| WO | 2006029626 | A1 | 3/2006 |

* cited by examiner

BEVERAGE DISPENSING DEVICE WITH FRESHNESS INDICATOR

The present invention relates to a freshness indicator for a chilled beverage, in particular to a beverage dispensing device with a freshness indicator for a chilled beverage. In particular, the present invention relates to a home draft beer dispensing and chilling system with a beer freshness indicator. The present invention relates further to a method of indicating the actual freshness of a chilled beverage.

Beverage dispensing devices and systems are known in the prior art. However, many problems encountered especially with regard to freshness of beverages subjected to varying storage temperatures have remained unsolved.

For instance, US-A1 20050121431 discloses a hand-held thermal mug. Said thermal mug has an external low-voltage electric socket, which can be connected to an automotive power source. Power is supplied to a temperature control device in the front part of said hand-held thermal mug. Said device consists of an automatic thermometer that indicates the temperature inside said container, a switch and four temperature-indicating lights. A user can freely adjust the temperature of the water inside said mug to a preferred level. Said mug can also maintain said temperature of said water inside, and provide a proper water temperature for said user. Said thermal mug is designed to fit mug trays in automobiles and vessels for convenience of the driver. A user can put any preferred beverages into said hand-held shatterproof thermal mug, and drink them at the set temperature at any time.

Further, WO-A1 2005113345 discloses a beverage dispensing system with an outer housing comprising a base element and pressure means. The container, preferably a keg, with an adaptor connectable with the tapping device contains an inner bag for holding a beverage and said inner bag is placeable in the outer housing, said inner bag having a deformable wall part which is compressible. said tapping device being used for dispensing beverages from the container upon deformation of the flexible wall part caused by gas pressure produced by the pressure means, and the outer housing comprising the base element for receiving the container, the base element of the outer housing functioning as a chiller, and the tapping device having at least one pressure port which is releasably connectable to the pressure means.

A beverage dispensing assembly is disclosed also in EP-A2 1 213 258. Said beverage dispensing assembly comprises an outer housing having a tapping device and pressure means, and a container being placeable in the outer housing, the container comprising a $CO_2$ containing beverage and having a deformable wall part which is compressible by the pressure means, an outlet and a flexible tube connectable to the outlet for dispensing the beverage from the container upon deformation of the flexible wall part by the pressure means, this tube comprising an outflow end positioning means for releasably engaging with the tapping device.

The beverage dispensing devices and systems described above and known in the prior art suffer from the drawback that the actual freshness of the beverage, the time left until expiry of the freshness of the beverage and/or the date of expiry of the freshness of the beverage, especially the actual degree of tastiness, is not indicated for the user.

The present invention addresses the problems of the prior art described above by providing a freshness indicator (9) for a chilled beverage, which freshness indicator device (9) comprises:

- a display (10) for indicating the storage temperature, maximum storage period, actual freshness of the beverage, the time left until expiry of the freshness and/or the date of expiry of the freshness,
- a data input unit (11) for the input of data and/or means (12) for recording replacement of the beverage container (4),
- at least one temperature sensor (13) for measuring the storage temperature of the beverage,
- a temperature controller (14) for adjusting the cooling temperature of the chiller (8),
- a data storage unit (15) for storing the freshness criteria,
- a signal processing unit (16), which temperature sensor (13) transmits a signal regarding the current beverage storage temperature to the signal processing unit (16) and the signal processing unit (16) calculates, depending on the recorded storage temperature period and based on stored freshness criteria, the actual freshness of the beverage, the time left until expiry of the freshness of the beverage and/or the date of expiry of the freshness of the beverage, and the signal processing unit (16) transmits the calculated data to the display (10).

According to a preferred embodiment of the present invention, there is provided a beverage dispensing device (1) with a freshness indicator (9) for a chilled beverage, wherein the beverage dispensing device (1) comprises an outer housing (7), a tapping device (2) for dispensing a beverage, a beverage container (4) being placeable in the outer housing (7) and connectable with the tapping device (2), and the outer housing (7) functioning as a chiller (8), said beverage freshness indicator device (9) comprising:

- a display (10) for indicating the storage temperature, maximum storage period, actual freshness of the beverage, the time left until expiry of the freshness and/or the date of expiry of the freshness,
- a data input unit (11) for the input of data and/or means (12) for recording replacement of the beverage container (4),
- at least one temperature sensor (13) for measuring the storage temperature of the beverage,
- a temperature controller (14) for adjusting the cooling temperature of the chiller (8),
- a data storage unit (15) for storing the freshness criteria,
- a signal processing unit (16), which temperature sensor (13) transmits a signal regarding the current beverage storage temperature to the signal processing unit (16) and the signal processing unit (16) calculates, depending on the recorded storage temperature period and based on stored freshness criteria, the actual freshness of the beverage, the time left until expiry of the freshness of the beverage and/or the date of expiry of the freshness of the beverage, and the signal processing unit (16) transmits the calculated data to the display (10).

A more preferred embodiment of the present invention is directed to a beverage dispensing device with a freshness indicator for a chilled beverage, wherein the beverage dispensing device comprises an outer housing, a tapping device with a pressure port, pressure means for dispensing a beverage, a beverage container being placeable in the outer housing and connectable with the tapping device, and the outer housing functioning as a chiller, characterized in that the beverage freshness indicator device comprises:

- a display for indicating the storage temperature, maximum storage period, actual freshness of the beverage, the time left until expiry of the freshness and/or the date of expiry of the freshness,
- a data input unit for the input of data and/or means for recording replacement of the beverage container, at least one temperature sensor for measuring the storage temperature of the beverage, a temperature controller for adjusting the cooling temperature of the chiller, a data storage unit for storing the freshness criteria, a signal processing unit, which temperature sensor transmits a signal regarding the current beverage storage temperature to the signal processing unit and the signal processing unit calculates, depending on the recorded storage temperature period and based on stored freshness criteria, the actual freshness of the beverage, the time left until expiry of the freshness of the beverage and/or the date of expiry of the freshness of the beverage, and the signal processing unit transmits the calculated data to the display.

The storage temperature means the cooling temperature of the beverage.

The beverage according to the present invention can be a carbonated beverage and most preferably the carbonated beverage is beer.

The present invention solves the problem of determining the actual freshness of a chilled beverage, the time left until expiry of the freshness of said beverage and/or the date of expiry of the freshness of said beverage and indicating it to a user.

In general, the filling date is printed on every beverage container/keg and said data may be entered into the data input unit of the freshness indicator. For example, a keg which is filled at a later point in time will last longer.

Further, the storage temperature of the beverage before broaching may be worth to be entered into the data input unit of the freshness indicator for calculating the freshness and tastiness of said beverage.

Also, the storage temperature after broaching, known from the temperature sensor of the beverage dispensing device, may be entered into the data input unit of the freshness indicator for calculating the freshness and tastiness of said beverage, since a lower storage temperature keeps a beverage, such as beer, longer fresh and tasty compared to a higher storage temperature.

According to the present invention, all kinds of freshness information such as expiry date, period and grade of freshness and tastiness can be calculated, detected and/or indicated by said freshness indicator device. For example, the number of days the chilled beverage placed in the beverage dispensing device will be fresh and/or tasty can be calculated and displayed.

Since the time passed after filling the beverage container and before broaching can be relevant with respect to the tastiness and freshness of the beverage, the freshness indicator device according to the present invention can be designed such that the storage time between filling the beverage container and broaching can be programmed by a user and/or is automatically detected by a sensor, which can read out information. The information may be a bar code or it may be provided via Radio Frequency Identification (RFID). The sensor can read out the bar code or receive the RFID-data in order to obtain the necessary information with respect to the date of filling of the beverage container and the like. Based on the date of broaching the beverage container, the freshness indicator device can calculate freshness and tastiness and provide information in this respect to the user. The time of broaching can be entered by a user and/or detected by actuating the tapping device, actuating the pressure gas flow and/or by switching on the beverage dispensing device.

A further preferred beverage dispensing device with a beverage freshness indicator device as can be used according to the present invention, comprises an outer housing, a tapping device, pressure means for dispensing a beverage, a beverage container being placeable in the outer housing and being connectable with the tapping device, wherein the outer housing functions as a chiller for the beverage. It may be preferred that the inner bottom part of the outer housing comprises a chiller plate.

According to one embodiment, the beverage dispensing device provided with a freshness indicator device of the present invention can be a beverage, preferably beer, dispensing apparatus for domestic application, which is adapted to sit on a countertop in a kitchen where there is only little space. Such a beverage dispensing assembly is disclosed in EP-A2 1 213 258 and fully included herein by reference. Said beverage dispensing assembly comprises an outer housing having a tapping device and pressure means, and a container being placeable in the outer housing, the container comprising a $CO_2$ containing beverage and having a deformable wall part which is compressible by the pressure means, an outlet and a flexible tube connectable to the outlet for dispensing the beverage from the container upon deformation of the flexible wall part by the pressure means, this tube comprising an outflow end positioning means for releasably engaging with the tapping device. The housing further comprises a cooling device, for example a Peltier element, for cooling the beverage container.

An alternative beverage dispensing device provided with a freshness indicator device according to the present invention can be a beverage, preferably beer, dispensing apparatus for domestic application, comprising an outer housing, a tapping device, pressure means, and a container containing an inner bag for holding a beverage, which container is placeable in the outer housing, and the inner bag of the container comprises preferably a $CO_2$-containing beverage such as beer, and said inner bag has at least a deformable wall part which is compressible by pressure means, an outlet and a flexible tube connected to the outlet for dispensing beverage from the container upon deformation of the flexible wall part of the inner bag by the pressure means, which tube comprises, at an outflow end, positioning means for releasably engaging with the tapping device. The housing further comprises a cooling device, for example a Peltier element, for cooling the beverage container.

However, it may be most preferred that the container contains an inner bag for holding a beverage and that said inner bag has a deformable wall part which is compressible for dispensing beverages from the container upon deformation of the flexible wall part caused by gas pressure produced by the pressure means.

A valve assembly for use in such beverage containers with an inner bag for holding a beverage is described in WO-A1 03/050031 and WO-A1 2005113415, and is fully incorporated herein by reference.

Further, a beverage dispensing device marketed by PHILIPS ELECTRONICS N.V. under the trademark Perfect Draft® can be used to be provided with a freshness indicator device according to the present invention.

The beverage freshness indicator device according to the present invention comprises a display for indicating the storage temperature, actual freshness of the beverage, the time left until expiry of the freshness and/or the date of expiry of the freshness.

The beverage freshness indicator device according to the present invention provides a user with information about the present freshness or tastiness status of the beverage in the beverage dispensing device. Thus, the freshness of the beverage, i.e. an indication whether the beverage, preferably beer, is still fresh and tasty, can be displayed on a display. The display can be arranged on or integrated in the outer housing of the beverage dispensing device. Further, the display can be arranged on the outer top surface of the beverage dispensing device. However, it may be most preferred that the display is arranged at the outer housing of the beverage dispensing device below the tapping device, so that the user can easily check the status of the chilled beverage.

According to the present invention, the display of the freshness indicator device can indicate the status of freshness by an array of lighted spots in different colors and /or different icons.

Thus, the display can in its simplest form indicate by means of different colors, for example green for fresh and tasty and red for expired, whether the beverage, preferably beer, is still fresh and tasty or has reached expiration.

According to a preferred embodiment of the present invention, the display is a LED-Display, OLED-Display, liquid crystal display (LCD) or plasma display. However, the display can be any kind of display suitable to display information.

In general, it may be preferred that the display provides information about the storage temperature, actual freshness of the beverage, the time left until expiry of the freshness and/or the date of expiry of the freshness. Further, it may be preferred that the display provides information about the grade of freshness or grade of tastiness. That means that the display provides the user with information regarding the present status of freshness or grade of tastiness compared to or calculated on the basis of the grade of freshness or grade of tastiness at the start point or a start point set by the user.

The start point is the time at which the grade of freshness or grade of tastiness can be calculated. The start point can be the time point when the beverage container is placed in the beverage dispensing device, the time at which the chiller has been started to cool the beverage or the time at which the beverage has achieved the storage temperature.

According to a preferred embodiment of the present invention, the time point at which the grade of freshness or grade of tastiness is calculated may be set by the user. However, it is preferred that the start point is automatically set at the time the electric current is switched on, i.e. the beverage dispensing device is switched on.

Further, the time left until expiry of the freshness and/or the date of expiry of the freshness of the beverage, preferably beer, can be calculated from the given start point or from a start point that is individually set by the user.

According to one embodiment, the start point can be automatically set by means for recording replacement of the beverage container integrated in the beverage dispensing device. The means for recording replacement can be a pressure sensor, activated by the weight of the beverage container. Alternatively, the means for recording replacement can be a contact sensor, activated by closing the beverage dispensing device, connecting the tapping device with the beverage container, and the like.

The beverage freshness indicator device according to the present invention comprises further a data input unit for the input of data related to freshness and tastiness and the like. The data input unit can be operated by the user and/or is operated by the beverage dispensing device. For example, a user can enter in said data input unit the start point (start), end point (stop), date of expiry of the beverage, storage temperature, change of storage temperature, time of storage of the beverage container, change of a beverage container, individual grade of freshness or grade of tastiness, type of beverage and the like.

The number of days that the beverage remains fresh and/or tasty (end point) can be the number of days for which the beverage is guaranteed by the producer to be fresh and/or tasty.

According to a preferred embodiment of the present invention, the user can enter in said data input unit an individual storage temperature period and/or an individual freshness or tastiness model or cycle for a specific beverage adjusted to the user's individual taste. Thus, a user can enter his individual freshness or tastiness profile of a specific beverage, preferably beer. Moreover, according to the present invention, a user or a number of users can enter individual freshness or tastiness profiles with respect to a specific type of beer.

The beverage freshness indicator device according to the present invention comprises further at least one temperature sensor for measuring the storage temperature of the beverage. The storage temperature is important with respect to the freshness and tastiness of the beverage. Based on the storage temperature recorded by the temperature sensor and sent to the signal processing unit, the actual freshness of the beverage, the time left until expiry of the freshness and/or the date of expiry of the freshness can be calculated.

Further, the temperature sensor can be used to control and/or adjust the cooling temperature of the chiller in order to keep the beverage temperature at the desired temperature.

In general, the cooling temperature of the chiller may be from −3° C. to 25° C., preferably from −2° C. to 20° C. and more preferably from 3° C. to 18° C. Depending on the beverage, the cooling temperature of the chiller may be lower than 0° C. or higher than 25° C. However, for beer it may be preferred that the cooling temperature of the chiller is from 3° C. to 18° C. to cool the beer to this temperature.

The beverage freshness indicator device according to the present invention comprises further a temperature controller for adjusting the cooling temperature of the chiller.

Further, the beverage freshness indicator device according to the present invention comprises a data storage unit for storing the freshness or tastiness criteria.

The freshness or tastiness criteria can be preset by the manufacturer for a variety of beverages, such as beer types. Based on the stored data and with respect to the recorded storage temperature period, at least the actual freshness of the beverage, the time left until expiry of the freshness and/or the date of expiry of the freshness can be calculated. The preset data regarding the freshness or tastiness criteria can be obtained from consumer tests for a variety of different beer types stored under different temperature conditions. Further, based on consumer tests, physical tests and/or chemical tests known in the prior art to determine the grade of freshness or tastiness of a beverage, algorithms/formulas can be provided to calculate the maximum storage period, the actual freshness of the beverage, the time left until expiry of the freshness and/or the date of expiry of the freshness. For example, based on the storage temperature, the reaming time left of the beverage can be calculated. A higher storage temperature of the beverage shortens the storage lifetime of the beverage, whereas a lower storage temperature of the beverage prolongs the time up to which the beverage is fresh and tasty.

According to a preferred embodiment, the freshness or tastiness criteria data can be individually set by the user via the data input unit as above mentioned.

Further, the freshness or tastiness criteria data can be provided via a learning cycle; this means that the data storage unit stores the storage data, such as storage temperature and storage time for a number of beverage containers stored in a beverage dispensing device according to the present invention. Based on this user profile, the storage temperature can be optimized and energy may be saved without a negative effect on the freshness or tastiness of the beverage.

The beverage freshness indicator device according to the present invention comprises also a signal processing unit for processing the data stored in the data storage unit, which data are received from the data input unit and/or sensors and the like.

For example, the temperature sensor transmits a signal regarding the current beverage storage temperature to the signal processing unit and the signal processing unit calculates, depending on the recorded storage temperature period and based on stored freshness criteria, the actual freshness or taste of the beverage, the time left until expiry of the freshness of the beverage and/or the date of expiry of the freshness of the beverage, and the signal processing unit then transmits the calculated data to the display.

However, via the data input unit the stored freshness criteria can be individually set by a user.

According to one embodiment of the present invention, the freshness indicator device and/or the beverage dispensing device can further comprise a temperature controller for manually regulating the cooling temperature of the chiller.

According to a preferred embodiment of the present invention, the display and the data input unit can be arranged on the outer surface of the housing, and the temperature controller can be arranged on the outer surface of the housing, can be integrated in the display or can be integrated in the housing of the beverage dispensing device. Further, the temperature sensor can be arranged at an inner surface wall of the housing and the data storage unit can be integrated in the signal processing unit or in the housing of the beverage dispensing device. The signal processing unit can be integrated in the display or in the housing of the beverage dispensing device.

Another aspect of the present invention is directed to the use of a freshness indicator device or a beverage dispensing device with a freshness indicator for a chilled beverage for

- adjusting the cooling temperature of the beverage, preferably from −3° C. to 25° C. and more preferably from 3° C. to 18° C.; and/or
- calculating the actual freshness of said beverage, and/or
- calculating the time left until expiry of the freshness of said beverage; and/or
- calculating the date of expiry of the freshness of said beverage depending on the storage temperature of the beverage.

The cooling temperature can be automatically adjusted by the freshness indicator device depending on the storage period, freshness or tastiness data and/or user profile stored. However, the user can also individually adjust the cooling temperature if the cooling temperature of the beverage dispensing device can be regulated manually. If the storage temperature is given by the user, the maximum storage period, actual freshness of the beverage, the time left until expiry of the freshness and/or the date of expiry of the freshness is calculated on said storage temperature based on the freshness data preset by the manufacturer or based on the individual user profile with respect to the specific beverage.

Another aspect of the present invention is directed to a method of determining the actual freshness of a chilled beverage and/or the actual date of expiry of the freshness of a chilled beverage by means of a beverage freshness indicator device according to the present invention, which method comprises the steps of:

- measuring the beverage temperature with a temperature sensor,
- transmitting signals regarding the real beverage storage temperature to the signal processing unit,
- calculating the actual freshness of the beverage, the time left until expiry of the freshness and/or the date of expiry of the freshness of said chilled beverage in the signal processing unit based on the freshness criteria stored in the signal processing unit,
- displaying the data of the actual freshness of the beverage, the time left until expiry of the freshness of the beverage and/or the date of expiry of the freshness of the beverage received from the signal processing unit on a display.

For example, treating a 6 liter container with an inner bag containing the beer in a beverage dispensing device according to the present invention at a temperature of 3° C. keeps the beer fresh at least up to 30 days, preferably at least 30 days.

The actual freshness can be visualized as a number. For example, the actual freshness of the beverage can be set as "10" when the beverage is placed in the beverage dispensing device (start) and as "0" for the expiry date of the beverage (end). The actual freshness can then be displayed in whole numbers on the display. For example, the expiry date for a beer stored in the beverage dispensing device at 3° C. is 30 days, the display displays the actual freshness as outlined in table I.

TABLE I

| beverage = beer number of days left until expiry date | storage temperature | actual freshness |
|---|---|---|
| 30 (start/broaching of the beverage container) | 3° C. | 10 |
| 29 | 3° C. | 10 |
| 28 | 3° C. | 10 |
| 27 | 3° C. | 9 |
| 26 | 3° C. | 9 |
| 25 | 3° C. | 9 |
| 24 | 3° C. | 8 |
| 23 | 3° C. | 8 |
| 22 | 3° C. | 8 |
| 21 | 3° C. | 7 |
| 20 | 3° C. | 7 |
| 19 | 3° C. | 7 |
| 18 | 3° C. | 6 |
| 17 | 3° C. | 6 |
| 16 | 3° C. | 6 |
| 15 | 3° C. | 5 |
| 14 | 3° C. | 5 |
| 13 | 3° C. | 5 |
| 12 | 3° C. | 4 |
| 11 | 3° C. | 4 |
| 10 | 3° C. | 4 |
| 9 | 3° C. | 3 |
| 8 | 3° C. | 3 |
| 7 | 3° C. | 3 |
| 6 | 3° C. | 2 |
| 5 | 3° C. | 2 |
| 4 | 3° C. | 2 |
| 3 | 3° C. | 1 |
| 2 | 3° C. | 1 |
| 1 | 3° C. | 1 |
| 0 (end = expiry date) | 3° C. | 0 |

As already mentioned, the freshness criteria used for calculating the actual freshness of the beverage determine the actual expiry date of the freshness of the beverage and/or the user can individually set the actual expiry date of the freshness of the beverage. Based on said data, an individual user profile for a specific beverage, such as beer, with respect to freshness or tastiness can be provided for different storage temperature conditions.

Another aspect is directed to a method of saving energy, when using the beverage dispensing device according to the present invention.

The method regulates the chilling temperature and alternates the freshness time period of a freshness indicator device or a beverage dispensing device with a freshness indicator device according to the present invention, said method comprising the steps of:

- setting an expiry date or selecting one of a variety of given expiry dates for the beverage at the data input unit,
- calculating the cooling temperature based on the freshness criteria stored in the signal processing unit depending on the selected expiry date,
- regulating the cooling temperature of the chiller accordingly,
- displaying the actual freshness of the beverage, the time left until expiry of the freshness of the beverage and/or the date of expiry of the freshness of the beverage.

The present invention is further described with reference to the accompanying drawings, which show an embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

Figure 1:
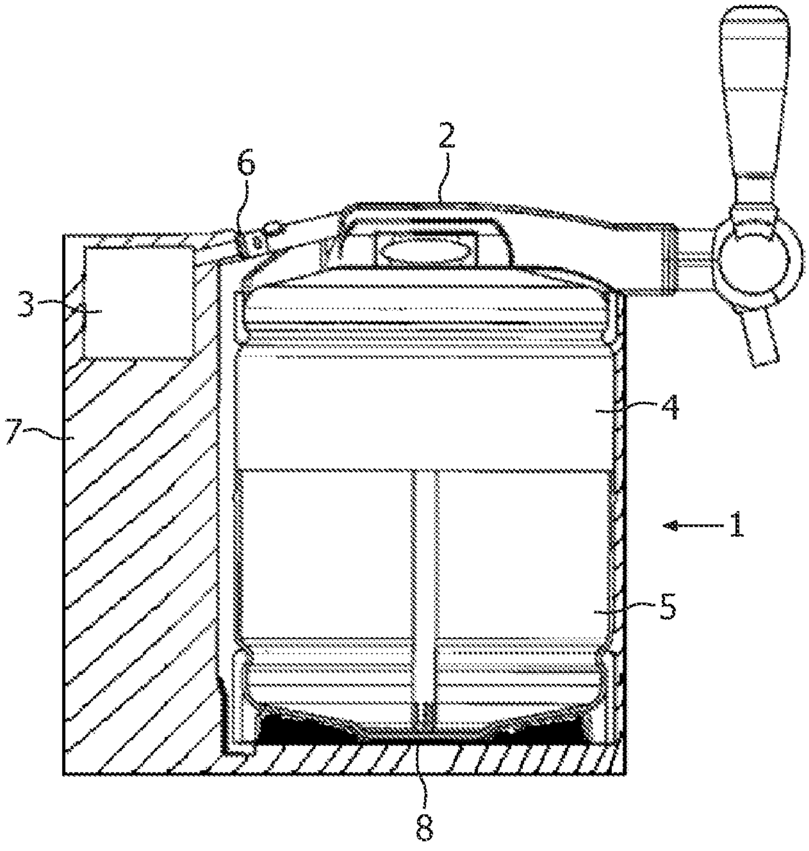
FIG. 1 is a sectional side view of a prior art beverage dispensing device.

FIG. 1 shows a prior art beverage dispensing device 1 comprising a tapping device 2, an outer housing 7 (partly shown), pressure means 3, and a container 4 in the form of a keg 4, wherein the container 4 contains an inner bag 5 comprising a beverage and being placeable in the outer housing 7, said inner bag 5 having a deformable wall part which is compressible for dispensing beverages from the container 4 upon deformation of the flexible wall part caused by gas pressure produced by the pressure means 3, the base part of the outer housing 7 functioning as a chiller 8, and the tapping device 2 having at least one pressure port 6 which is releasably connectable to the pressure means 3.

Figure 2:
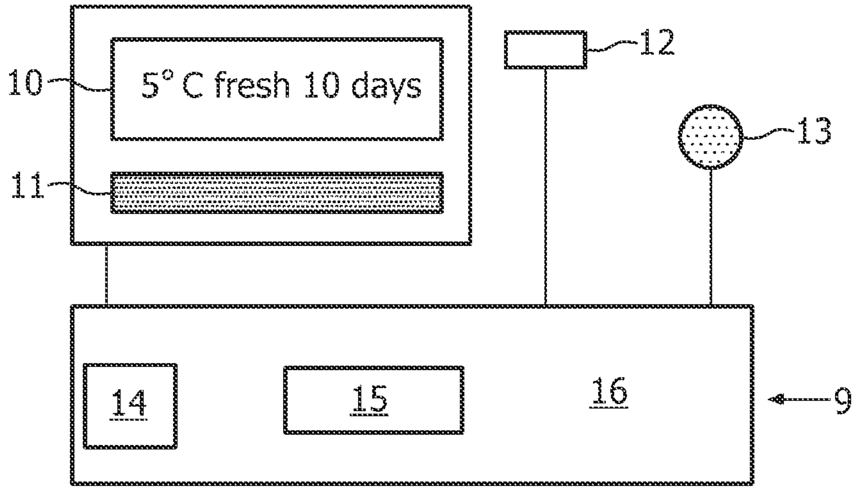
FIG. 2 is a schematic view of a freshness indicator device according to the present invention.

FIG. 2 shows a freshness indicator device 9 comprising a display 10, a data input unit 11, means 12 for recording replacement of a beverage container, a temperature sensor 13, a temperature controller 14 for adjusting the cooling temperature of a chiller 8 (not shown), a data storage unit 15 and a signal processing unit 16. The freshness indicator device 9 can be used for a beverage dispensing device to provide information with respect to the freshness and tastiness of a beverage depending on the storage temperature thereof.

Means 12 for recording replacement of a beverage container can simply be a switch actuated by a user. Simpler still, the replacement of a beverage container can be entered via the data input unit by a user. In that case, additional means, such as means 12 for recording replacement of a beverage container are not necessarily required.

The freshness indicator device 9 can be activated by replacing a beverage container 4 in the beverage dispensing device 1. The activation of the freshness indicator device 9 to monitor the freshness or tastiness of a beverage can be achieved via means 12, which are suitable to detect replacement of a beverage container 4. Means 12 suitable to detect a beverage container replacement can be selected from the group comprising pressure sensor, contact sensor and the like. The replacement of a beverage container can more simply be indicated to the signal processing unit 16 by switching the electric current off and on. According to the present invention, a combination of both may be preferred. Still more preferably, the user activates the freshness indicator device 9 by actuating the data input unit 11.

The data input unit 11 can be used to enter data, such as type of beverage and expiry date of the beverage given by the manufacturer. Based on the expiry date and type of beverage, the signal processing unit can calculate, based on the profile stored in the data storage unit 15, the freshness or tastiness of the beverage depending on the storage temperature. If the beverage dispensing device 1 is for beer only, it is not necessary to enter the type of beverage. However, it may be preferred that an individual profile for each of a number of different beers is stored in the data storage unit 15. In that case, the user can differentiate the type of beer via the data input unit 11.

The manufacturer can preset the data profiles stored in the data storage unit 15. These data profiles for a beverage can be obtained by testing the beverage under a variety of storage temperature conditions. Since these data obtained by consumer tests are an average result, it may be an additional feature of the freshness indicator device 9 that the user can enter an individual freshness or tastiness profile via the data input unit 11.

According to a preferred embodiment of the present invention, the freshness indicator device 9 facilitates a user to select the storage temperature of the beverage. In general, beer is widely accepted by the consumer at temperatures from 3° C. to 18° C. Based on the storage temperature adjusted by the user, the freshness indicator device 9 can calculate for example the maximum storage period, actual freshness of the beverage, the time left until expiry of the freshness and/or the date of expiry of the freshness.

The temperature controller 14 controls and regulates the adjusted storage temperature of the beverage. According to a preferred embodiment of the present invention, the freshness indicator device 9 can be used to save energy. Further, the user can select different cooling temperatures of the beverage for a number of time periods. It is also possible that the freshness indicator device 9 tracks the time periods at which the user actuates the tapping device 2 to draft a beverage. Based on that information, the freshness indicator device 9 can adjust the chiller temperature to the preferred beverage temperature of the user.

Further, based on the drinking behavior of the user, the freshness indicator device 9 can track the time period between replacement of beverage containers 4 or the length of time of a beverage container 4 in the beverage dispensing device 1. Based on that data, the freshness indicator device 9 can calculate an optimal storage temperature for the beverage. Also, based on the freshness or tastiness data stored in the data storage unit 15, the user can receive information with respect to the maximum storage time for a specific storage temperature.

Figure 3:
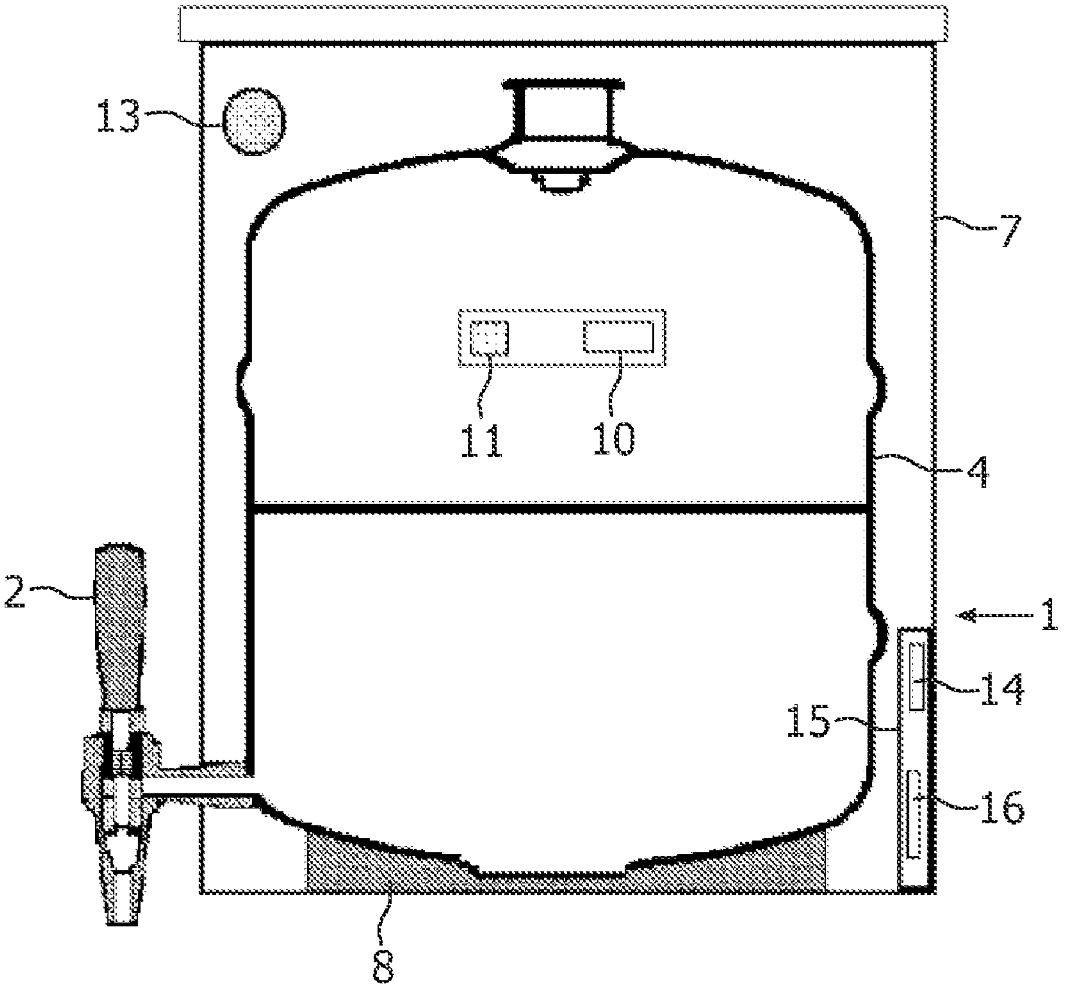
FIG. 3 is a schematic view of a freshness indicator device according to the present invention with pressure means.

FIG. 3 shows a beverage dispensing device 1 according to the present invention comprising a tapping device 2, an outer housing 7 (partly shown), a container 4 in the form of a keg 4 comprising a beverage and being placeable in the outer housing 7. The beverage can be dispensed from the container 4 under the action of gravity. Pressurization can for example be achieved via a top opening of the keg (not shown). The base part of the outer housing 7 comprises a chiller 8, and the tapping device 2 is releasably connectable to the beer keg 4. The beverage dispensing device 1 further comprises a freshness indicator device 9 comprising a display 10, a data input unit 11, a temperature sensor 13, a temperature controller 14 for adjusting the cooling temperature of the chiller 8, a data storage unit 15 and a signal processing unit 16. The display 10 and the data input unit 11 are arranged at the outer surface of the housing 7 of the beverage dispensing device 1. It may be preferred that the display 10 and the data input unit 11 are arranged at the outer surface of the housing 7 below the tap of the tapping device 2 so that the user, when drafting a beer, simultaneously gets the desired information with respect tastiness and freshness of the beverage. The temperature sensor 13 can be arranged at an inner sidewall of the outer housing 7.

Figure 4:
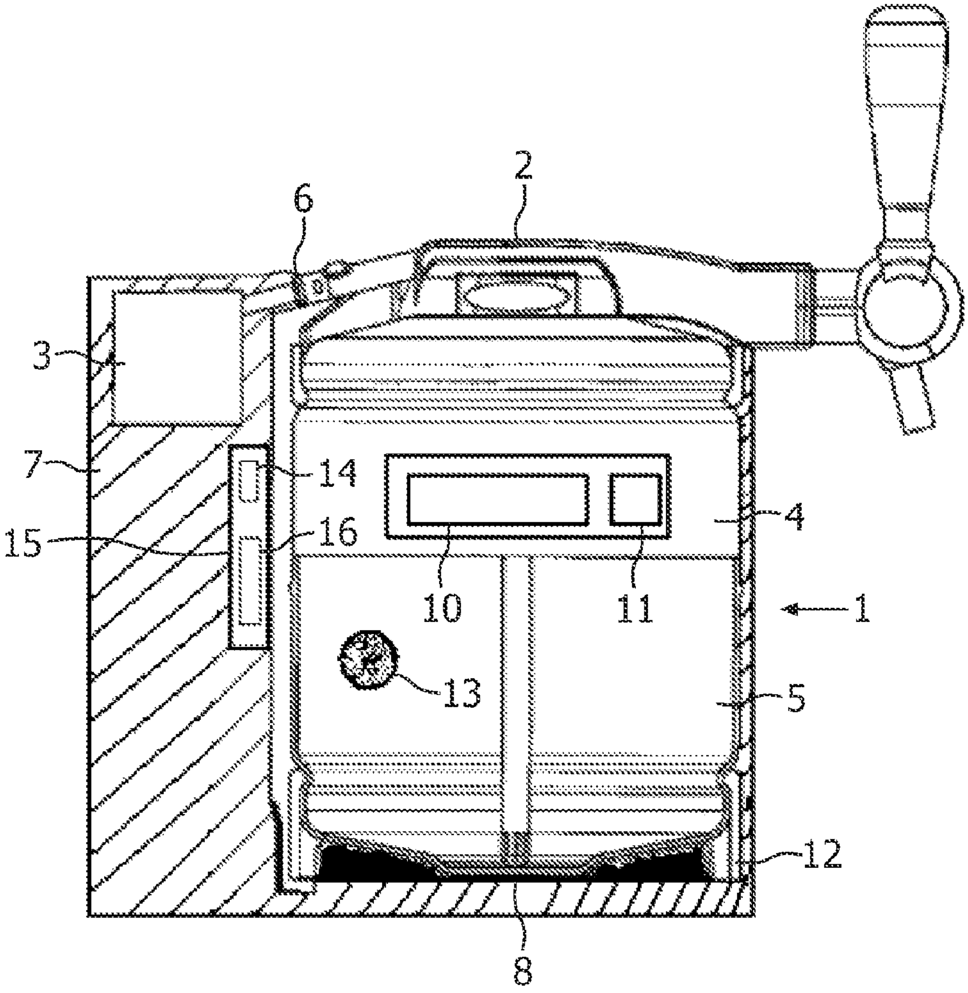
FIG. 4 is a sectional side view of a beverage dispensing device with a freshness indicator device according to the present invention.

FIG. 4 shows a beverage dispensing device 1 according to the present invention comprising a tapping device 2, an outer housing 7 (partly shown), pressure means 3, and a container 4 in the form of a keg 4, wherein the container 4 contains an inner bag 5 comprising a beverage and being placeable in the outer housing 7, said inner bag 5 having a deformable wall part which is compressible for dispensing beverages from the container 4 upon deformation of the flexible wall part caused by gas pressure produced by the pressure means 3, the base part of the outer housing 7 comprising a chiller 8, and the tapping device 2 having at least one pressure port 6 which is releasably connectable to the pressure means 3. The means 12 holds the container in place and functions as a contact sensor, such that a contact between the container and the means 12 transmits replacement of the beverage container to the signal processing unit 16. The beverage dispensing device 1 further comprises a freshness indicator device 9 comprising a display 10, a data input unit 11, a temperature sensor 13, a temperature controller 14 for adjusting the cooling temperature of the chiller 8, a data storage unit 15 and a signal processing unit 16. The display 10 and the data input unit 11 are arranged at the outer surface of the housing 7 of the beverage dispensing device 1. It may be preferred that the display 10 and the data input unit 11 are arranged at the outer surface of the housing 7 below the tap of the tapping device 2. The temperature sensor 13 may be arranged at an inner sidewall of the outer housing 7.

To provide a comprehensive disclosure without unduly lengthening the specification, the applicant hereby incorporates by reference each of the patents and patent applications referenced above.

The particular combinations of elements and features in the above detailed embodiments are exemplary only; the interchanging and substitution of these teachings with other teachings in this and the patents/applications incorporated by reference are also expressly contemplated. As those skilled in the art will recognize, variations, modifications, and other implementations of what is described herein can occur to those of ordinary skill in the art without departing from the spirit and the scope of the invention as claimed. Accordingly, the foregoing description is by way of example only and is not intended as limiting. The invention's scope is defined in the following claims and the equivalents thereto. Furthermore, reference signs used in the description and claims do not limit the scope of the invention as claimed.

The invention claimed is:

1. A device for a chilled beverage, the device comprising:

a display for indicating a storage temperature, a maximum storage period, a freshness of the beverage, a time left until expiry of the freshness and/or a date of expiry of the freshness;

a data input unit for recording replacement of a beverage container;

at least one temperature sensor for measuring the storage temperature of the beverage;

a temperature controller for adjusting a cooling temperature of a chiller;

a data storage unit for storing a freshness profile relating freshness of a beverage to storage temperature and length of storage; and a signal processing unit, wherein the temperature sensor is programmed to transmit a signal regarding a current beverage storage temperature to the signal processing unit and the signal processing unit is programmed to periodically record the current storage temperature and time of storage at the recorded storage temperature and calculate at least one of the time left until expiry of the freshness of the beverage and the date of expiry of the freshness of the beverage depending on the recorded storage temperature, the period of time at the recorded storage temperature and based on the stored freshness profile, and the signal processing unit is further configured to transmit the calculated data to the display.

2. The device according to claim 1, wherein the display indicates freshness by an array of lighted spots in different colors and/or different icons.

3. The device according to claim 1, wherein the temperature controller is configured for manually regulating the cooling temperature of the chilled beverage.

4. The device according to claim 1, comprising a beverage dispensing device comprising a housing, a tapping device for dispensing beverage, a beverage container placeable in the housing and connectable to the tapping device, with the housing configured to operate as a chiller.

5. The device according to claim 4, wherein the beverage dispensing device comprises a pressure port for receiving pressure to dispense a beverage.

6. The device according to claim 4, wherein the chiller is a chiller plate and a base part of the housing comprises the chiller plate.

7. The device according to claim 4, wherein the temperature controller is configured for manually regulating the cooling temperature of the chiller.

8. The device according to claim 4, wherein the beverage container comprises an inner bag for holding a beverage, the inner bag having a deformable wall part which is compressible for dispensing beverages from the beverage container upon deformation of the deformable wall part by gas pressure or gravity.

9. The device according to claim 4, wherein the display and the data input unit are arranged on an outer surface of the housing, the temperature controller is arranged on the outer surface of the housing, is integrated in the display or is integrated in the housing, the temperature sensor is arranged at an inner surface wall of the housing, the data storage unit is integrated in the signal processing unit or in the housing, the signal processing unit is integrated in the display or in the housing.

10. The device according to claim 4, wherein the beverage is a carbonated beverage.

11. A method of controlling a temperature of a beverage, the method comprising acts of:

a signal processing unit calculating at least one of a time left until expiry of the freshness of the beverage and a date of expiry of the freshness of the beverage depending on a periodically recorded actual storage temperature, the period of time at the recorded storage temperature and based on a stored freshness profile relating freshness of a beverage to storage temperature and length of storage; and adjusting a cooling temperature of the beverage based on the calculated freshness of said beverage.

12. A method of determining a freshness of a chilled beverage, the method comprising acts of:

a signal processing unit receiving a measure of a beverage temperature;

calculating at least one of the time left until expiry of the freshness and the date of expiry of the freshness of said chilled beverage based on a freshness profile relating freshness of a beverage to actual storage temperature and length of storage at the actual storage temperature; and transmitting a signal indicating the calculated freshness of the beverage to a display.

13. The method according to claim 12, wherein at least one of the freshness profile, a cooling temperature of the beverage and the actual date of expiry of the freshness of the beverage is individually set by a user.

14. A method of regulating a chilling temperature of a beverage, the method comprising acts of:

a signal processing unit receiving an expiry date for the beverage;

calculating a at least one of the time left until expiry of the freshness of the beverage and the date of expiry of the freshness of the beverage based on a freshness profile relating freshness of a beverage to actual storage temperature and length of storage at the actual storage temperature and the received expiry date; and regulating the chilling temperature of the beverage based on the calculated freshness of the beverage.

15. The method accordingly to claim 14, comprising an act of the signal processing unit transmitting a signal indicating the calculated freshness of the beverage to a display.

The following is an examiner's statement of reasons for allowance: In addition to the remarks of record, the cited prior art fails to teach or suggest the claimed method and processor programmed to calculate the time remaining for the beverage to be considered "fresh" or the period of time relating to the freshness profile based upon the actual temperature of the beverage.

* * * * *